(12) United States Patent
Kiryu et al.

(10) Patent No.: US 6,669,095 B2
(45) Date of Patent: *Dec. 30, 2003

(54) CARD-TYPE PERIPHERAL DEVICE

(75) Inventors: Koichi Kiryu, Iiyama (JP); Kimiyo Takahashi, Iiyama (JP)

(73) Assignee: Fujitsu Takamisawa Component Limited, Shinagawa-ku (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/548,735

(22) Filed: Apr. 13, 2000

(65) Prior Publication Data

US 2003/0089784 A1 May 15, 2003

(30) Foreign Application Priority Data

Apr. 20, 1999 (JP) .............................. 11-112283

(51) Int. Cl.$^7$ ............................... G06K 19/00
(52) U.S. Cl. ...................... 235/487; 361/736
(58) Field of Search ................ 235/441, 487, 235/492; 361/683, 684, 686, 737, 736; 439/92, 76.1, 637, 55

(56) References Cited

U.S. PATENT DOCUMENTS

| | | | | |
|---|---|---|---|---|
| 5,502,617 A | * | 3/1996 | Tsukada et al. ............. 361/684 |
| 5,653,596 A | * | 8/1997 | Banakis et al. ................ 439/64 |
| 5,864,463 A | * | 1/1999 | Tsukada et al. ............. 361/684 |
| 6,025,993 A | * | 2/2000 | Wakabayashi et al. ...... 361/705 |
| 6,075,706 A | * | 6/2000 | Learmonth et al. .......... 235/441 |
| 6,106,309 A | * | 8/2000 | Kakinoki .................... 439/76.1 |

FOREIGN PATENT DOCUMENTS

| | | | | |
|---|---|---|---|---|
| JP | 5-201184 | | 8/1993 | |
| JP | 9-139254 | | 5/1997 | |
| JP | 10-105666 A | * | 4/1998 | .......... G06K/19/00 |

* cited by examiner

Primary Examiner—Karl D. Frech
Assistant Examiner—Jamara A. Franklin
(74) Attorney, Agent, or Firm—Staas & Halsey LLP (57) ABSTRACT

A card-type peripheral device including a circuit board having a ground conductor, a conductive frame for supporting the circuit board, and a conductive panel attached to the conductive frame and cooperating with the conductive frame to surround the circuit board. The conductive frame includes a frame section having an exposed surface portion, a first contact section formed integrally with the frame section and making an electrically conductive contact with the ground conductor of the circuit board, and a second contact section formed integrally with the frame section and making an electrically conductive contact with the conductive panel. The first contact section preferably exhibits a spring action so as to establish a good electrically conductive connection between the frame section of the conductive frame and the ground conductor of the circuit board. The second contact section also preferably exhibits a spring action so as to establish a good electrically conductive connection between the conductive frame and the conductive panel.

17 Claims, 8 Drawing Sheets

CARD-TYPE PERIPHERAL DEVICE

BACKGROUND OF THE INVENTION

1. Field of the Invention

The present invention relates generally to peripheral equipment for use with an electronic apparatus and, particularly, to a card-type peripheral device, suitably used in a detachable manner, for a small-sized portable electronic apparatus.

2. Description of the Related Art

In peripheral equipment usable for small-sized portable electronic apparatuses, such as a notebook-size personal computer, a digital camera and so on, a card-type peripheral device that can be detachably attached to the housing of the electronic apparatus has been known. Also, various types of card-type peripheral devices acting as memories, interfaces, etc. are available. A typical card-type peripheral device is formed by assembling a circuit board carrying electronic parts thereon, a connector for connecting the circuit board with a certain objective apparatus, and a hollow, card-shaped housing for accommodating therein the circuit board and the connector.

Conventionally, a card-type peripheral device is provided with various countermeasures for noise, such as a provision of an electrically conductive material for the housing, in order to protect the internal circuitry from external noise, such as electromagnetic waves or static electricity, as well as to suppress the radiation of electromagnetic waves from the internal circuitry. Particularly, in the card-type peripheral device generically called a PC card or a PCMCIA card, it has been standard to form a ground terminal at a predetermined position on the outer periphery of the card-shaped housing, the ground terminal serving to connect ground conductors or lines on the circuit board with the ground of an objective apparatus body.

In a typical conventional PC card with noise control measures, the housing is constituted from a rectangular frame for supporting the circuit board and the connector, and a pair of upper and lower, electrically conductive panels fitted to the frame to cover the front and back sides of the circuit board. The conductive panels are electrically connected to the ground conductors on the circuit board via contact elements, which have resilience and electrical conductivity, such as compression coil springs or leaf springs. Further, an electrically conductive clip is attached to a predetermined position of the frame, and is soldered to the ground conductor of the circuit board, so that the ground terminal is formed at a predetermined position on the outer periphery of the housing. When the noise control measures are to be enhanced, electrical conductivity is imparted not only to the panels but also to the frame.

As described above, the typical conventional PC card uses some additional components for noise control measures, i.e., the contact elements for connecting the ground conductors on the circuit board to the panels, and the clip for forming the ground terminal at a predetermined position of the frame. These additional components are generally very small, and thus make the operation for soldering these components onto the circuit board to incorporate them in the frame and the panels troublesome. In particular, skilful work is required for ensuring the positional precision of the components. As a result, and due to the increased number of components, the manufacturing cost of the PC card tends to increase.

SUMMARY OF THE INVENTION

It is therefore an object of the present invention to provide a card-type peripheral device including a frame for supporting a circuit board and an electrically conductive panel fitted to the frame, the card-type peripheral device also being provided with proper and stable noise control measures which can be easily made at a relatively low cost without using any additional component.

In order to accomplish the above objects, the present invention provides a card-type peripheral device comprising a circuit board having a ground conductor; a conductive frame for supporting the circuit board; and a conductive panel attached to the conductive frame and cooperating with the conductive frame to surround the circuit board; wherein the conductive frame includes a frame section having an exposed surface portion, a first contact section formed integrally with the frame section and making electrically conductive contact with the ground conductor of the circuit board, and a second contact section formed integrally with the frame section and making electrically conductive contact with the conductive panel.

In this card-type peripheral device, it is preferred that the first contact section exhibits a spring action.

The frame section of the conductive frame may be provided with a board receptacle for receiving the circuit board, and the first contact section may be formed in the board receptacle.

The first contact section may include a resiliently deformable arm integrally joined at a proximal end thereof with the frame section and a projection as a contact point integrally protruding from a distal end of the arm.

It is advantageous that the conductive frame further includes an engaging section formed on the frame section adjacent to the first contact section, the engaging section cooperating with the first contact section to hold the circuit board at a predetermined position.

It is also preferred that the second contact section exhibits spring action.

The frame section of the conductive frame may be provided with a panel receptacle for receiving the conductive panel, and the second contact section may be formed in the panel receptacle.

The second contact section may include a resiliently deformable arm integrally joined at a proximal end thereof with the frame section and a projection as a contact point integrally protruding from a distal end of the arm.

The frame section of the conductive frame may be provided with a slit for receiving an engaging piece formed on the conductive panel, and the second contact section may be formed in the slit.

The frame section of the conductive frame may be provided with a recess for receiving an extension formed on the conductive panel, the extension serving as a visually distinguishable ground terminal.

The first contact section may be constituted as a plurality of first contact sections respectively formed integrally with the frame section, and the second contact section may be structured as a plurality of second contact sections respectively formed integrally with the frame section.

The conductive panel may be constituted as a pair of conductive panels respectively arranged on opposite sides of the conductive frame, the pair of conductive panels being electrically connected with each other when the conductive panels are assembled together on the conductive frame.

The card-type peripheral device may further comprise a connector incorporated in the card-type peripheral device for an electrical connection of the circuit board.

The conductive frame may be integrally molded from an electrically conductive resinous material.

BRIEF DESCRIPTION OF THE DRAWINGS

The above and other objects, features and advantages of the present invention will become more apparent from the following description of preferred embodiments in connection with the accompanying drawings, in which.

DETAILED DESCRIPTION OF THE PREFERRED EMBODIMENTS

Figure 1:
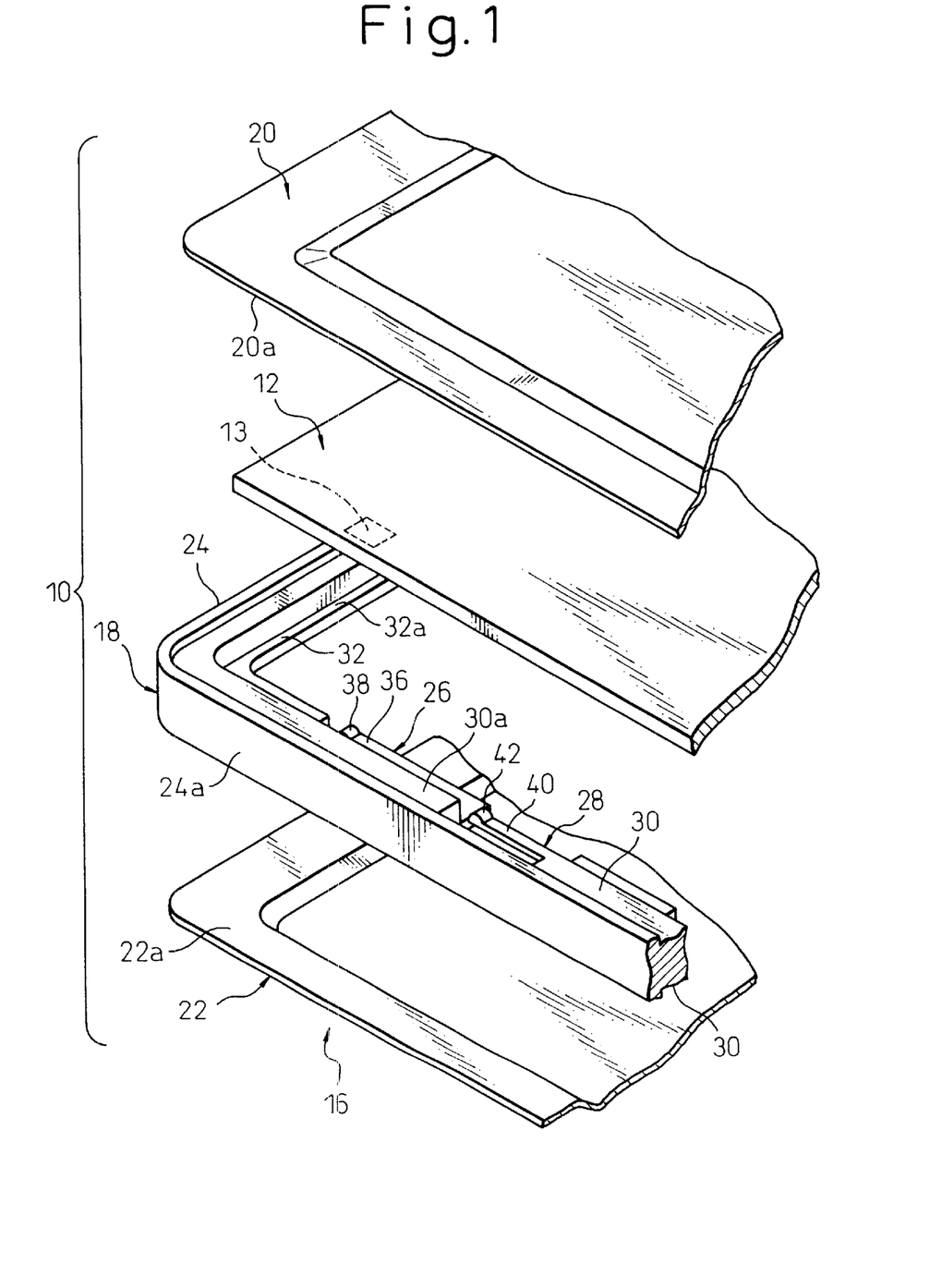
FIG. 1 is an enlarged exploded perspective view showing a part of the card-type peripheral device according to an embodiment of the present invention.
Figure 2:
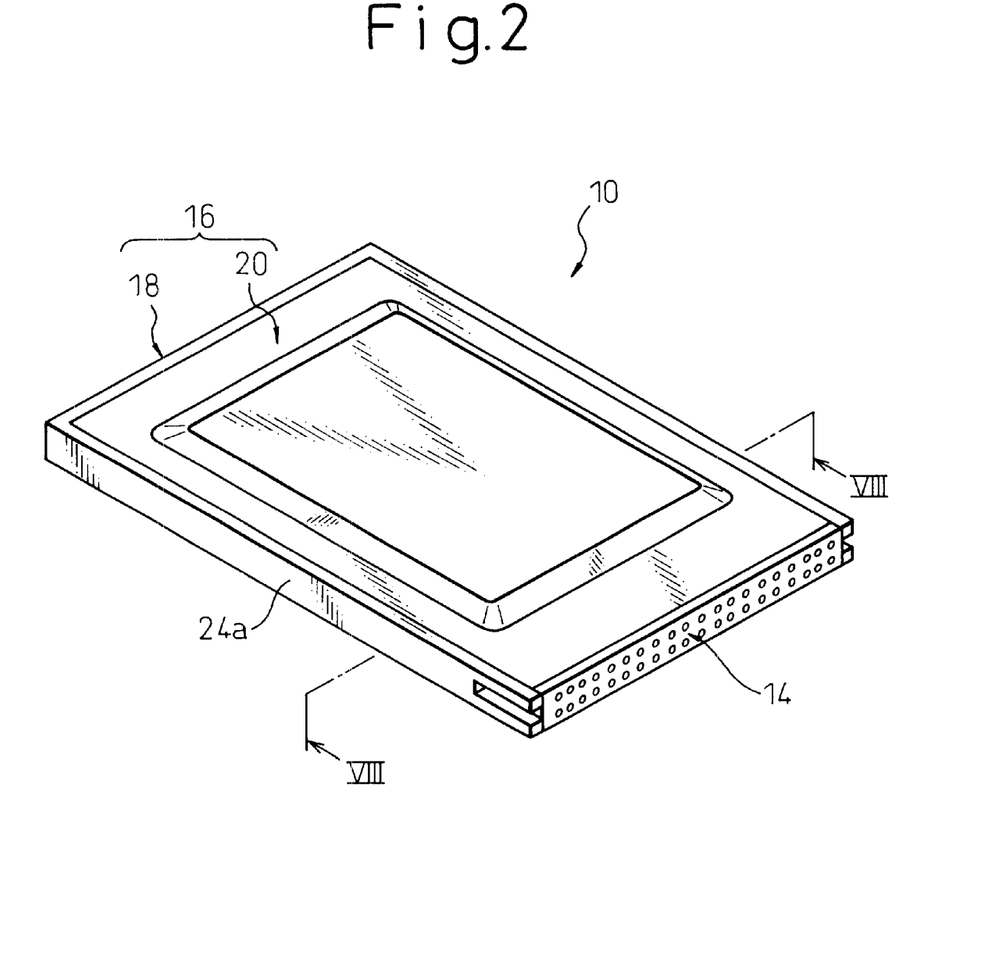
FIG. 2 is a perspective view showing the card-type peripheral device of FIG. 1 in an assembled state.

Referring to the drawings, wherein the same or similar components are denoted by common reference numerals, FIGS. 1 and 2 show a card-type peripheral device 10 according to an embodiment of the present invention. The card-type peripheral device 10 can be suitably used as a PC card complying with a PCMCIA standard. However, the present invention is not limited thereto but is adaptable to various card-type peripheral devices that comply with the other standards or that do not comply with any standard.

The card-type peripheral device 10 is formed by assembling a circuit board 12 carrying electronic parts (not shown) thereon, a connector 14 for electrically connecting the circuit board 12 with a certain objective apparatus, such as a notebook-size personal computer, a digital camera and so on, and a hollow, card-shaped housing 16 for accommodating therein the circuit board 12 and the connector 14. The housing 16 is constituted from an electrically conductive rectangular frame 18 for supporting the circuit board 12 and the connector 14, and a pair of upper and lower electrically conductive panels 20, 22 attached to the frame 18 to cover the front and back sides of the circuit board 12. When the card-type peripheral device 10 is assembled from these components, the connector 14, the frame 18 and the pair of panels 20, 22 cooperate to surround the circuit board 12.

The frame 18 includes a frame section 24 having a surface portion 24a exposed around an annular outer periphery of the card-type peripheral device 10, a first contact section 26 integrally formed on the frame section 24 and electrically connected to the surface portion 24a, and a second contact section 28 integrally formed on the frame section 24 and electrically connected to the first contact section 26. The first contact section 26 is adapted to make an electrically conductive contact with a ground conductor 13 formed on the circuit board 12, and the second contact section 28 is adapted to make an electrically conductive contact with at least one of the panels (the upper panel 20 in the illustrated embodiment). Preferably, the frame 18, including the frame section 24 and the first and second contact sections 26, 28, is integrally molded, as a whole, from an electrically conductive resinous material containing carbon or metal filler. Alternatively, the frame 18 may be formed by plating a metal on a resinous integrally-molded article, or may be made entirely of a metal. Similarly, each panel 20, 22 may be made entirely of a metal, or may be formed by plating a metal on a resinous integrally-molded article.

Figure 3:
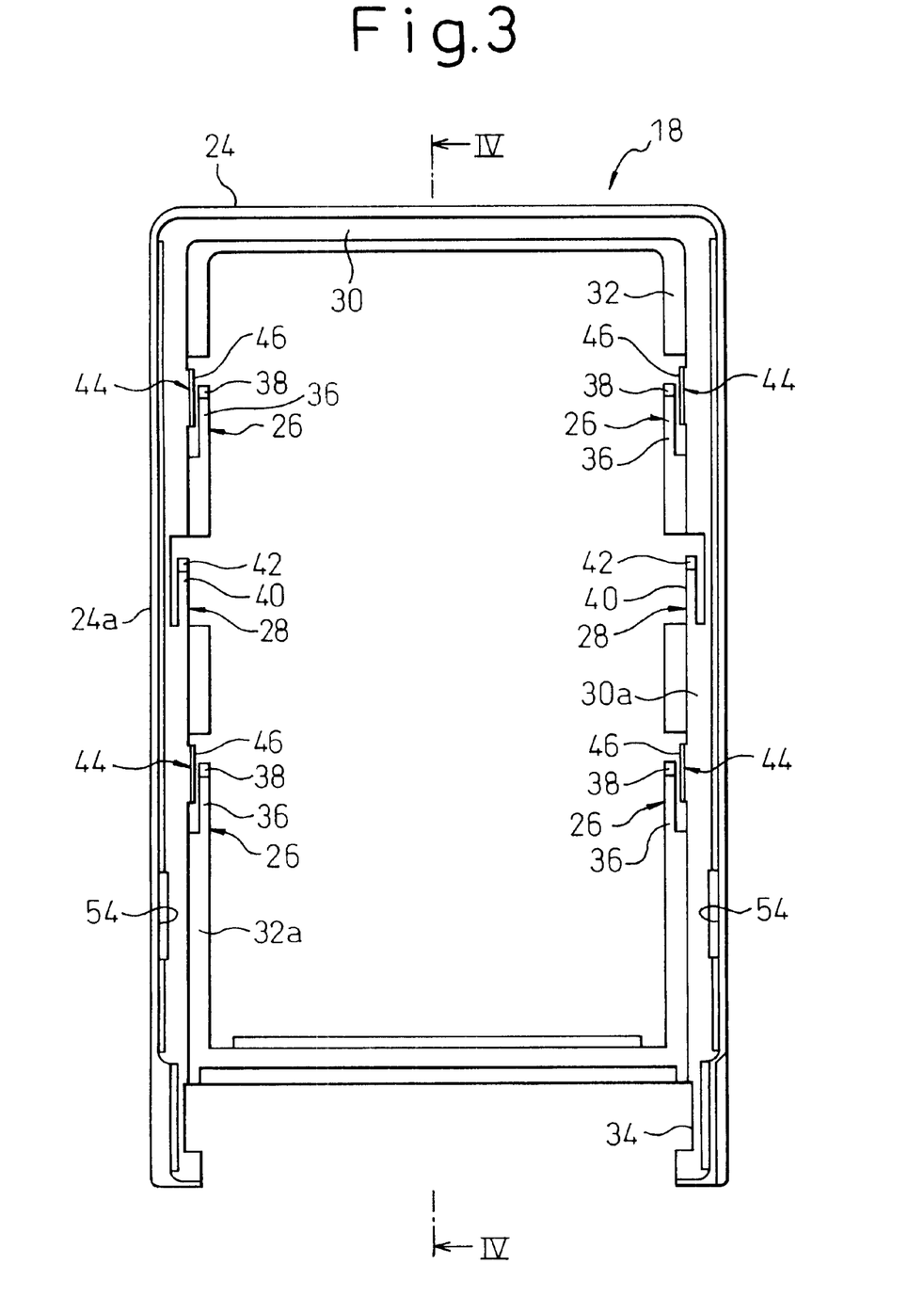
FIG. 3 is a plan view showing a frame used in the card-type peripheral device of FIG. 1.

The frame section 24 of the frame 18 is provided on the upper and lower sides thereof with panel receptacles 30 for receiving the panels 20, 22, respectively. Each panel receptacle 30 has a generally flat support surface 30a extending annularly to support the outer peripheral region of each panel 20, 22. The frame section 24 is also provided along the inner peripheral side thereof with a board receptacle 32 for receiving the circuit board 12, at a different height from both panel receptacles 30. The board receptacle 32 has a generally flat support surface 32a extending annularly to support the outer peripheral region of the circuit board 12. As shown in FIG. 3, a connector receptacle 34 for receiving the connector 14 (FIG. 2) is also formed at one longitudinal end of the frame section 24.

In the illustrated embodiment, the frame 18 is provided with a plurality (four, in the drawing) of first contact sections 26 at predetermined positions distributed in the circumferential direction of the frame section 24, and a plurality (two, in the drawing) of second contact sections 28 at predetermined positions spaced from the first contact sections 26 in the circumferential direction (see FIG. 3). This structure can advantageously establish a reliable and stable electrically-conductive contact between the frame 18 and the circuit board 12 and panel 20. Alternatively, the frame section 24 may be provided with only one first contact section 26 and only one second contact section 28.

Figure 4A:
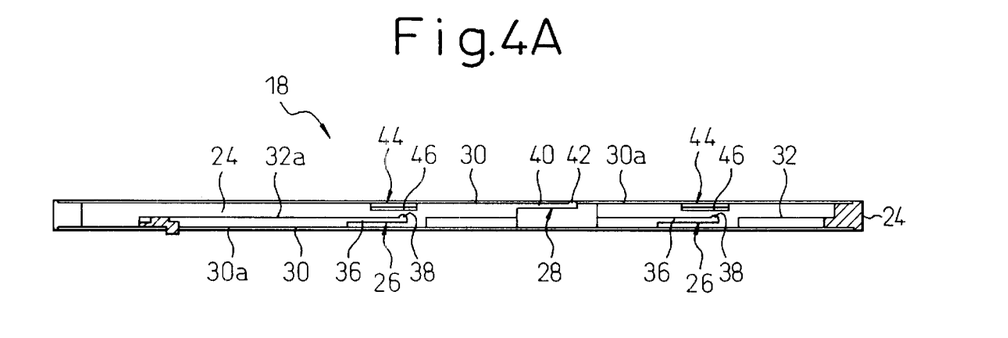
FIG. 4A is a sectional view of the frame, taken along a line IV—IV of FIG. 3.
Figure 4B:
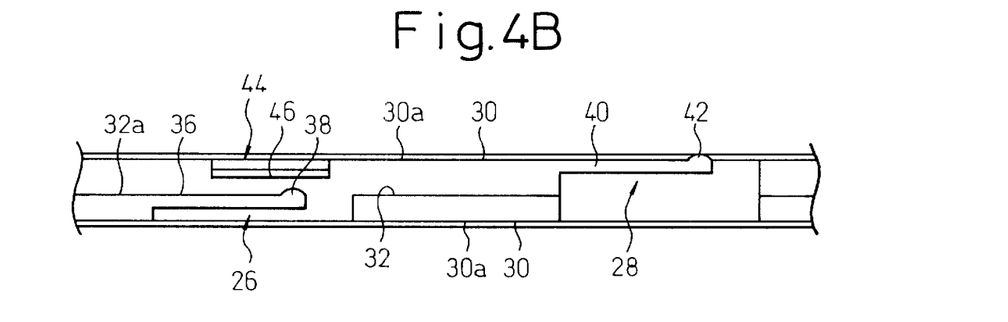
FIG. 4B is an enlarged sectional view showing a major portion of the frame of FIG. 4A.

As shown in FIGS. 3 to 4B, each first contact section 26 of the frame 18 is formed in the board receptacle 32 of the frame section 24, and includes a resiliently deformable arm 36 integrally extending from and joined at the proximal end thereof with the frame section 24 and a projection 38 as a contact point integrally protruding from a distal free end of the arm 36. The arm 36 has an upper side thereof located generally flush with the support surface 32a of the board receptacle 32 during an unloaded state. When an external force is applied onto the arm 36 or on the projection 38, the arm 36 is resiliently deformed to exhibit a desired resilience or spring action against the external force. In a state where no load is applied onto the arm 36, the projection 38 at the distal end of the arm 36 protrudes upward from the support surface 32a of the board receptacle 32.

Each second contact section 28 of the frame 18 is formed in the upper panel receptacle 30 of the frame section 24, and includes a resiliently deformable arm 40 integrally extending from and joined at the proximal end thereof with the frame section 24 and a projection 42 as a contact point integrally protruding from a distal free end of the arm 40. The arm 40 has an upper side thereof located generally flush with the support surface 30a of the panel receptacle 30 during an unloaded state. When an external force is applied onto the arm 40 or on the projection 42, the arm 40 is resiliently deformed to exhibit a desired resilience of spring action against the external force. In a state where no load is applied onto the arm 40, the projection 42 at the distal end of the arm 40 protrudes upward from the support surface 30a of the panel receptacle 30.

The frame 18 is further provided with engaging sections 44 formed adjacent to the respective first contact sections 26 in the frame section 24. Each engaging section 44 includes a rib 46 protruding along the inner peripheral wall of the frame section 24 defining the board receptacle 32. Each rib 46 extends generally parallel with the support surfaces 32a of the board receptacle 32, and is arranged opposite to the projection 38 at the distal end of each arm 36. A gap is defined between the projection 38 and the rib 46, into which the outer peripheral region of the circuit board 12 can be inserted and held.

Figure 5:
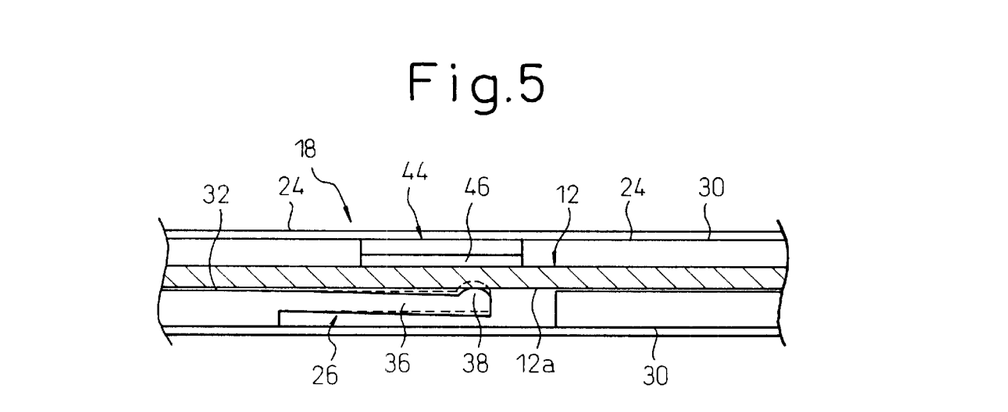
FIG. 5 is an enlarged sectional view showing a part of the frame of FIG. 3 to which a circuit board is fitted.

The circuit board 12 is fitted to the frame 18 with the outer peripheral region of the board being received in the board receptacle 32 of the frame section 24. In this state, the circuit board 12 is held, at predetermined positions in its outer peripheral region, between the projections 38 of the first contact sections 26 and the ribs 46 of the corresponding engaging sections 44 (see FIGS. 5 and 6). Then, the projection 38 of each first contact section 26 comes into contact with the circuit board 12 and is pushed down by the latter, whereby the arms 36 are resiliently deformed from an unloaded position (shown by a broken line) and shifted into a loaded position (shown by a solid line). As a result, the arm 36 exhibits a desired resilience or spring action and the projection 38 is abutted, under a certain pressure, to one surface 12a of the circuit board 12. In this manner, the first contact sections 26 cooperate with the corresponding engaging sections 44 so as to stably hold the circuit board 12 on the frame 18 at a predetermined position.

A plurality of ground conductors 13 (only one ground conductor 13 is shown) are formed on the surface 12a of the circuit board 12 by, e.g., locally forming apertures in a resist film provided for protecting a circuit pattern. The ground conductors 13 are formed at locations respectively corresponding to the locations of the projections 38 of the first contact sections 26 at the time when the circuit board 12 is properly arranged on the frame 18. Accordingly, when the circuit board 12 is fitted to and held on the frame 18 at the predetermined position, the projections 38 of the first contact sections 26 are respectively brought into contact with the ground conductors 13 under desired pressure produced by the spring action of the arms 36. As a result, an electrically conductive contact, with high stability and reliability, is obtained between the ground conductors 13 and the corresponding first contact sections 26, which can resist vibration or shock. In this manner, the surface portion 24a of the frame section 24 of the frame 18 is electrically connected to the ground conductors 13 of the circuit board 12 while maintaining a good electrically conductive state therebetween.

The arms 36 can also make reliable electrically conductive contact between the ground conductors 13 of the circuit board 12 and the first contact sections 26 of the frame 18 due to the spring action of the respective arms 36, even if the circuit board 12 fitted to the frame 18 has uneven thickness or if the plural circuit boards 12, adapted to be fitted to the plural frames 18, have variances in the thicknesses thereof.

Figure 6:
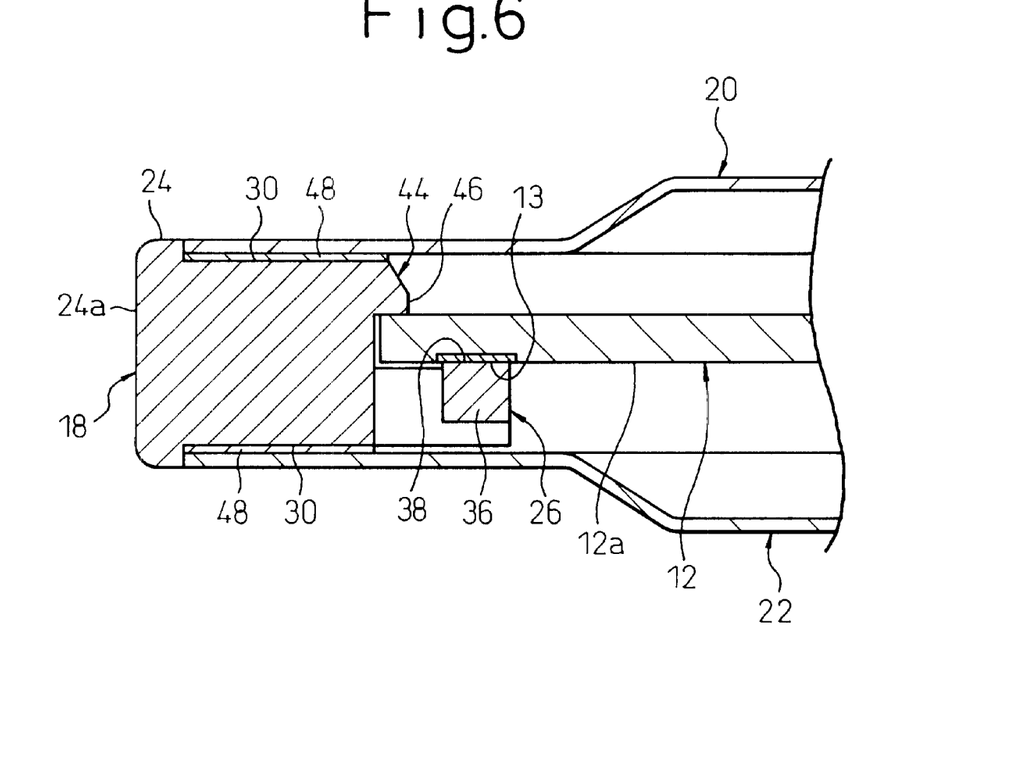
FIG. 6 is an enlarged sectional view showing another part of the frame of FIG. 3 in a direction different from FIG. 5, to which a circuit board as well as upper and lower panels are fitted.

Each panel 20, 22 is fitted to the frame 18 with the outer peripheral region of the panel being received in each panel receptacle 30 of the frame section 24. The panel 20, 22 is secured to the frame section 24 of the frame 18 via an adhesive layer 48 (FIG. 6). The panels 20 and 22 are also provided at predetermined positions on the outer edges of the respective panels (two positions, respectively, in the illustrated embodiment) with engaging pieces 50 and 52 (see FIG. 8) extending generally orthogonally to the back sides 20a and 22a of the panels 20 and 22, respectively. On the other hand, the frame 18 is provided with slits 54 (FIG. 3) at predetermined positions near the surface portion 24a of the frame section 24, the slits 54 penetrating through the frame section 24 between the opposite support surfaces 30a of the panel receptacles 30. When the engaging pieces 50, 52 of the panels 20, 22 are forcibly inserted into the slits 54 of the frame 18, the panels 20, 22 are stably held at predetermined positions on the frame 18.

Figure 7:
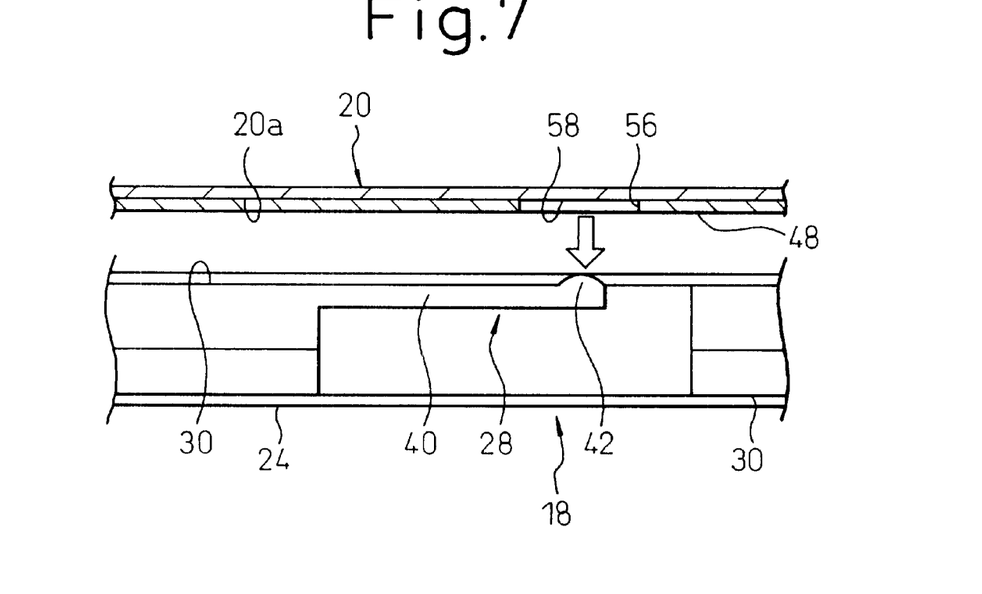
FIG. 7 is an enlarged sectional view showing another part of the frame of FIG. 3, in a state just before the upper panel is fitted to the frame.

The adhesive layer 48 may be formed from, e.g., a double-coated adhesive tape. As shown in FIG. 7, the adhesive layer 48 provided for the upper panel 20 has an opening 56 formed at a predetermined position, which enables the back surface 20a of the panel 20 to be locally exposed so as to form a contact surface section 58. In this embodiment, plural contact surface sections 58 are formed at locations respectively corresponding to the locations of the projections 42 of the second contact sections 28 at the time when the panel 20 is properly arranged on the frame 18. Accordingly, when the panel 20 is fitted to and held on the frame 18 at the predetermined position, the projections 42 of the second contact sections 28 are respectively brought into contact with the contact surface sections 58 under desired pressure produced by the spring action of the arms 40. As a result, the electrically conductive contact with high stability and reliability is obtained between the contact surface sections 58 and the corresponding second contact sections 28, which can resist vibration or shock.

Figure 8:
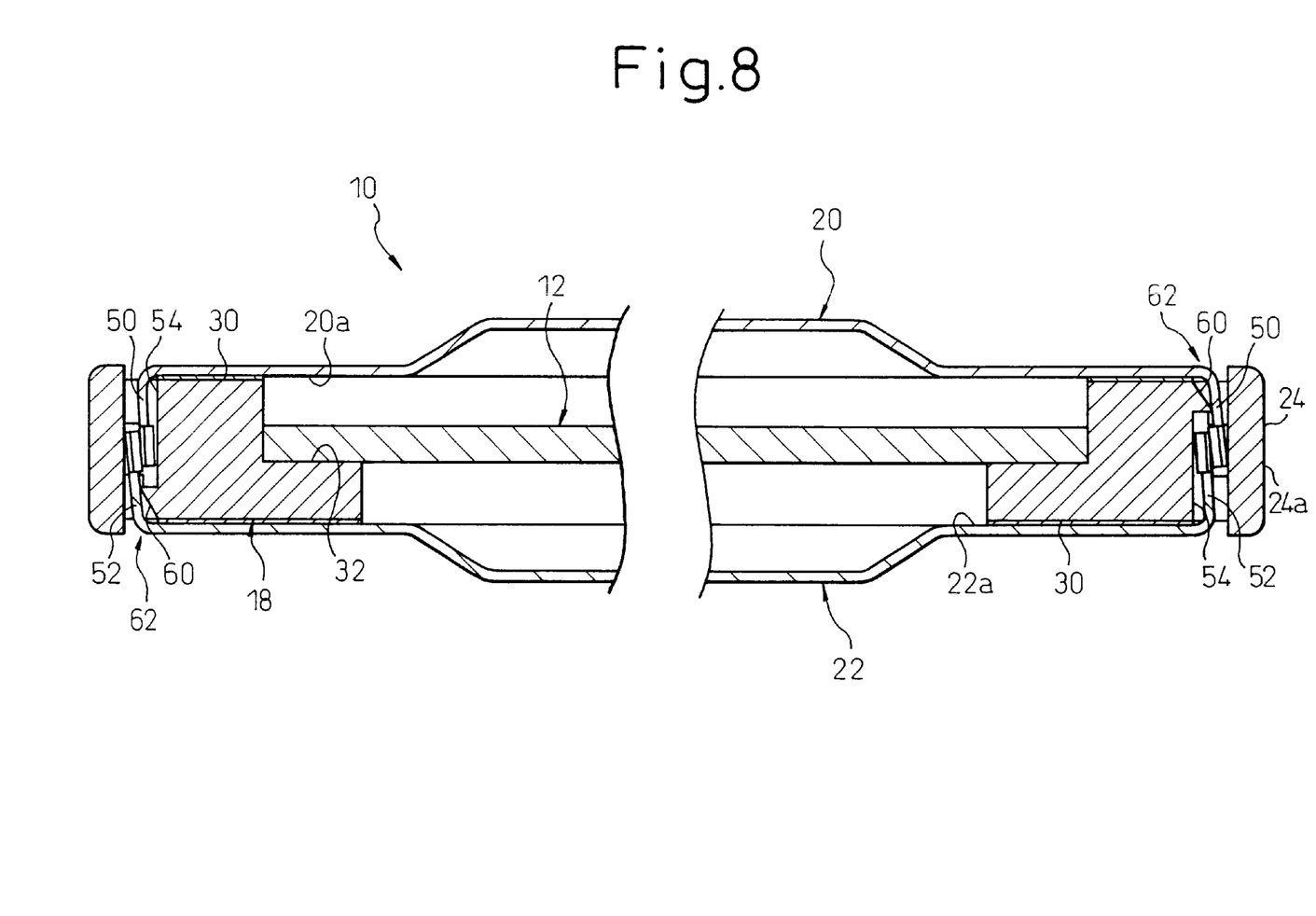
FIG. 8 is an enlarged sectional view of the card-type peripheral device, taken along a line VIII—VIII of FIG. 2, and showing a modification of a second contact portion.

As shown in FIG. 8, the engaging pieces 50 and 52 of the panels 20 and 22, forcibly inserted into the slits 54 of the frame 18 from the upper and lower sides, are brought into contact with each other, preferably under a certain pressure. The panels 20, 22 are thereby electrically connected with each other. In this manner, both panels 20, 22 are electrically connected to the surface portion 24a of the frame section 24 of the frame 18, as well as to the ground conductors 13 of the circuit board 12 via the frame 18, while maintaining a good electrically conductive state therebetween. Alternatively, it is possible to integrally form another second contact section in the frame section 24 of the frame 18, which comes into contact with the lower panel 22 in an electrically conductive manner.

In the card-type peripheral device 10 having the above structure, the frame section 24 of the electrically conductive frame 18 is integrally provided with the first contact sections 26 adapted to make an electrically conductive contact with the ground conductors 13 of the circuit board 12, so as to electrically connect the surface portion 24a of the frame section 24 with the ground conductors of the circuit board 12 while maintaining a good electrically conductive state therebetween, and therefore, the whole surface portion 24a of the frame section 24 serves as a ground terminal of the card-type peripheral device 10, while eliminating the use of an electrically conductive clip incorporated in the conventional card-type peripheral device. Also, the frame section 24 of the electrically conductive frame 18 is integrally provided with the second contact sections 28 adapted to make an electrically conductive contact with at least one of the upper and lower panels 20, 22, so as to electrically connect both panels 20, 22 with the surface portion 24a of the frame section 24 and with the ground conductors 13 of the circuit board 12 while maintaining a good electrically conductive state therebetween, and therefore, the panels 20, 22 are electrically connected to a ground potential, while eliminating the use of an electrically conductive contact element, such as a compression coil spring or a leaf spring, incorporated in the conventional card-type peripheral device.

Accordingly, the card-type peripheral device 10 eliminating conventionally-used small additional components, such as a clip or a contact element, can decrease the number of components and simplify an assembling process so as to prevent a production cost from increasing, and can be provided with proper and stable noise control measures which can be easily made at a relatively low cost. The card-type peripheral device 10 permits the whole surface portion 24 of the frame section 24 to serve as a ground terminal, and therefore, can be suitably used as a PC card complying with a PCMCIA standard.

Figure 9:
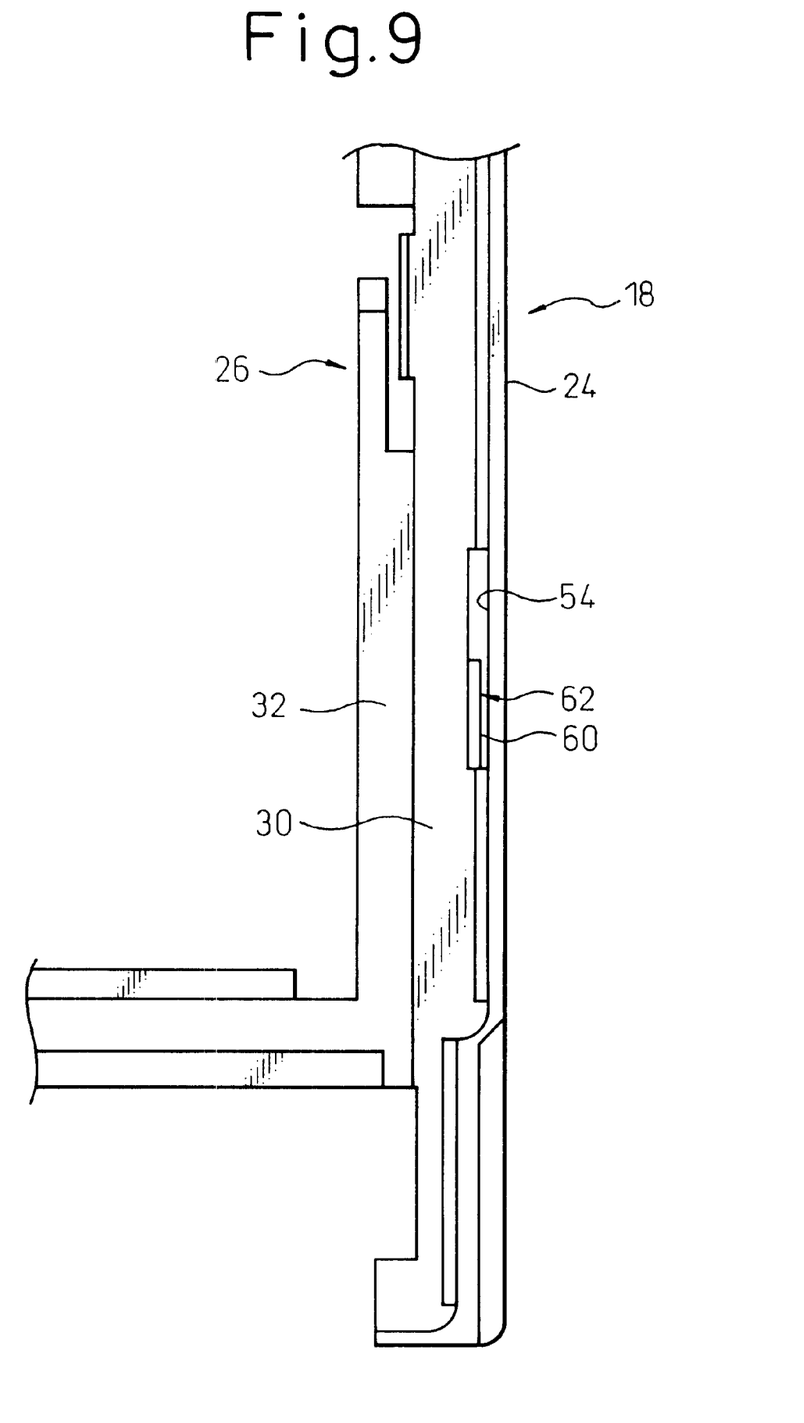
FIG. 9 is an enlarged plan view showing a part of the frame of the card-type peripheral device of FIG. 8.

The present invention is not limited to the above embodiment but can be modified in various ways. As shown in FIGS. 8 and 9, for example, ribs 60 may be formed in two slits 54 of the frame section 24 of the frame 18 so as to extend adjacent respectively to the upper and lower panel receptacles 30. The ribs 60 come into contact with the engaging pieces 50, 52 of the upper and lower panels 20, 22, forcibly inserted into the slits 54, in an electrically conductive state. Therefore, the ribs 60 serve as second contact sections 62, so as to electrically connect the panels 20, 22 with the surface portion 24a of the frame section 24 of the frame 18 as well as with the ground conductors 13 of the circuit board 12 via the frame 18, while maintaining a good electrically conductive state therebetween. In this arrangement, it is possible to constitute the engaging pieces 50, 52 of the panels 20, 22 in such a manner that the engaging pieces 50, 52 are resiliently deformed in the slits 54 to exhibit resilience or spring action and come into contact with the ribs 60 under certain pressure. The second contact sections 62 comprising the ribs 60 can be used in place of the above-described second contact sections 28 having resilience, or in addition to the latter.

Figure 10:
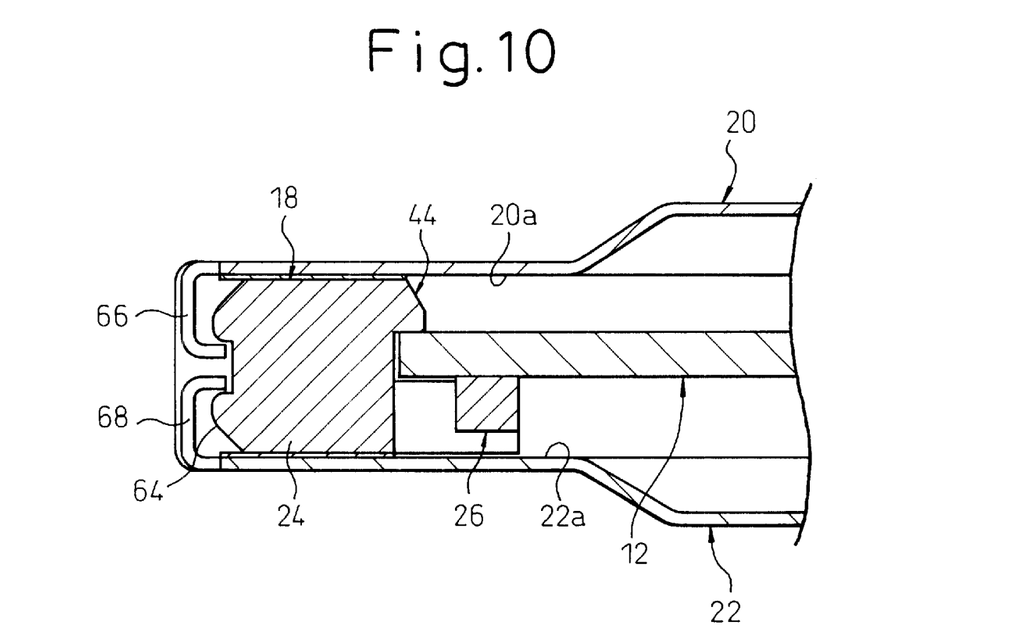
FIG. 10 is an enlarged sectional view showing a part of a modification of the card-type peripheral device.
Figure 11:
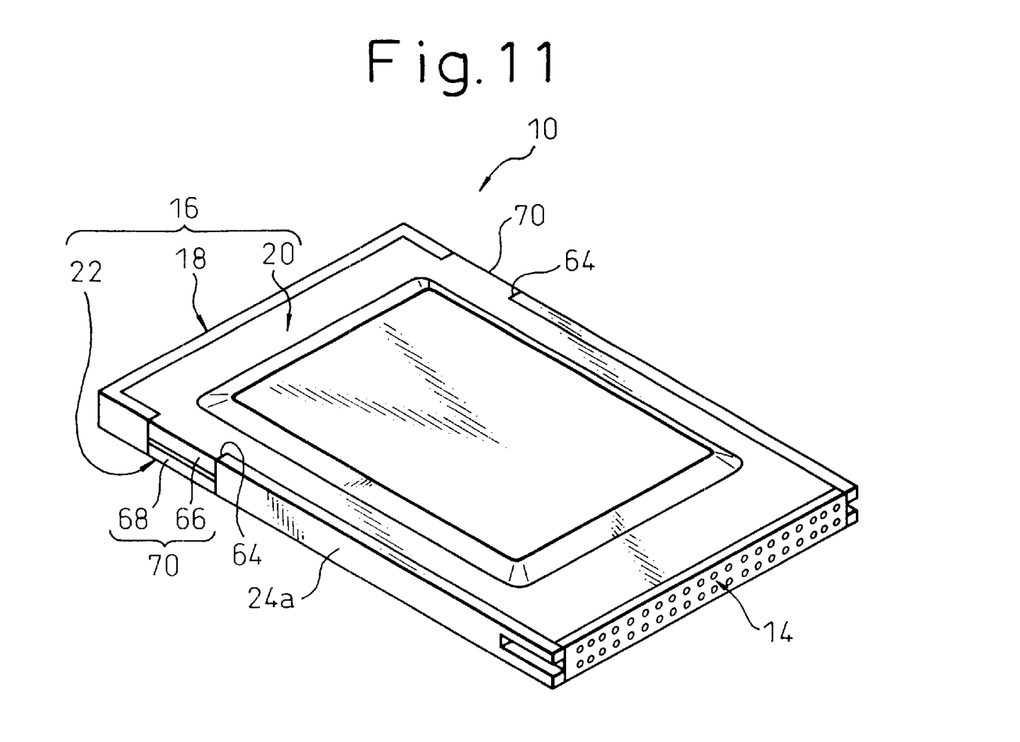
FIG. 11 is a perspective view of the modified card-type peripheral device of FIG. 10.

As shown in FIGS. 10 and 11, it is also possible to locally form recesses 64 at predetermined positions (two positions, in the illustrated modification) on the surface portion 24a of the frame section 24 of the frame 18, and to provide the panels 20, 22 with extensions 66, 68, respectively, which extend generally orthogonally to the back sides 20a, 22a of the panels at predetermined positions on the outer peripheries of the panels 20, 22 corresponding to the recesses 64. In this arrangement, the extensions 66, 68 of the panels 20, 22 are accommodated in the recesses 64 of the frame 18, so as to constitute ground terminals 70 of the card-type peripheral device 10. According to this structure, the surface portion 24a of the frame section 24 of the frame 18 remains to serve as the ground terminal as described above, and the ground terminals 70 are additionally provided so as to be visually distinguishable at positions required for the PCMCIA standard.

While the invention has been particularly shown and described with reference to preferred embodiments thereof, it will be understood by those skilled in the art that various changes and modifications may be made without departing from the spirit and scope of the following claims.

What is claimed is:

1. A peripheral device comprising:
   a circuit board having a ground conductor;
   a conductive frame supporting said circuit board; and
   a conductive panel attached to said conductive frame and cooperating with said conductive frame to surround said circuit board;
   wherein said conductive frame includes a frame section having an exposed surface portion, a first contact section formed integrally with said frame section and making electrically conductive direct contact with said ground conductor of said circuit board, and a second contact section formed integrally with said frame section and making electrically conductive direct contact with said conductive panel.

2. The peripheral device as set forth in claim 1, wherein said first contact section exhibits a spring action.

3. The peripheral device as set forth in claim 1, wherein said frame section of said conductive frame is provided with a board receptacle receiving said circuit board, and wherein said first contact section is formed in said board receptacle.

4. The peripheral device as set forth in claim 1, wherein said first contact section includes a resiliently deformable arm integrally joined at a proximal end thereof with said frame section and a projection as a contact point integrally protruding from a distal end of said arm.

5. The peripheral device as set forth in claim 1, wherein said conductive frame further includes an engaging section formed on said frame section adjacent to said first contact section, said engaging section cooperating with said first contact section to hold said circuit board at a predetermined position.

6. The peripheral device as set forth in claim 1, wherein said second contact section exhibits a spring action.

7. The peripheral device as set forth in claim 1, wherein said frame section of said conductive frame is provided with a panel receptacle receiving said conductive panel, and wherein said second contact section is formed in said panel receptacle.

8. The peripheral device as set forth in claim 1, wherein said second contact section includes a resiliently deformable arm integrally joined at a proximal end thereof with said frame section and a projection as a contact point integrally protruding from a distal end of said arm.

9. The peripheral device as set forth in claim 1, wherein said frame section of said conductive frame is provided with a slit receiving an engaging piece formed on said conductive panel, and wherein said second contact section is formed in said slit.

10. The peripheral device as set forth in claim 1, wherein said frame section of said conductive frame is provided with a recess receiving an extension formed on said conductive panel, said extension serving as a visually distinguishable ground terminal.

11. The peripheral device as set forth in claim 1, wherein said first contact section includes a plurality of first contact sections respectively formed integrally with said frame section, and wherein said second contact section includes a plurality of second contact sections, respectively, formed integrally with said frame section.

12. The peripheral device as set forth in claim 1, wherein said conductive panel includes a pair of conductive panels, respectively, arranged on opposite sides of said conductive frame, said pair of conductive panels being electrically connected with each other when said conductive panels are assembled together on said conductive frame.

13. The peripheral device as set forth in claim 1, further comprising:
   a connector incorporated in said peripheral device for an electrical connection of said circuit board.

14. The peripheral device as set forth in claim 1, wherein said conductive frame is integrally molded from an electrically conductive resinous material.

15. A peripheral device comprising:

a circuit board having a ground conductor;

a conductive panel; and a conductive frame to support said circuit board including a frame section having an exposed surface portion, a first contact section, which includes a deformable arm, is formed integrally with said frame section and makes electrically conductive direct contact with said ground conductor of said circuit board by elastically deforming the deformable arm of the first contact section, and a second contact section, which includes a deformable arm, is formed integrally with said frame section, and makes electrically conductive direct contact with said conductive panel by elastically deforming the deformable arm of the second contact section, and said conductive panel being attached to said conductive frame and cooperating with said conductive frame to surround said circuit board.

16. The peripheral device as set forth in claim 15, wherein the first contact section cooperates with a corresponding engaging section of the circuit board to hold the circuit board in a predetermined position.

17. The peripheral device as set forth in claim 15, wherein the deformable arm of the first contact section and the ground conductor make electrically conductive direct contact, even if a thickness of the circuit board is different along a surface of the circuit board.

* * * * *